(12) United States Patent
Yin

(10) Patent No.: US 6,421,626 B1
(45) Date of Patent: *Jul. 16, 2002

(54) LOW VOLTAGE/LOW POWER TEMPERATURE SENSOR

(75) Inventor: Rong Yin, Coppell, TX (US)

(73) Assignee: STMicroelectronics, Inc.., Carrollton, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/187,502

(22) Filed: Nov. 6, 1998

(51) Int. Cl.[7] .............................. G06F 15/00; G01K 7/00
(52) U.S. Cl. ..................... 702/132; 702/130; 324/721; 374/185
(58) Field of Search ................................. 702/130–133, 702/99; 374/178, 183–185; 324/719, 721, 760–765; 331/52, 176, 177 R, 66

(56) References Cited

U.S. PATENT DOCUMENTS

| | | | | |
|---|---|---|---|---|
| 4,150,573 A | * | 4/1979 | Iinuma et al. ............... | 374/185 |
| 4,277,975 A | * | 7/1981 | Pinkham ...................... | 374/178 |
| 5,883,550 A | * | 3/1999 | Watanabe et al. ............ | 331/177 |
| 6,005,408 A | * | 12/1999 | Gillette ........................ | 324/760 |

OTHER PUBLICATIONS

Vladimir Székely et al., "CMOS Sensors for On–Line Thermal Monitoring of VLSI Circuits", IEEE Transactions on VLSI Systems, vol. 5, No. 3, pp. 270–276, Sep. 1997.*
V. Szekely, et al., "CMOS Sensors for On–Line Thermal Monitoring of VLSI Circuits", *IEEE Transactions on Very Large Scale Integration (VLSI) Systems*, V. 5, No. 3, Sep. 1997, pp. 270–276.

* cited by examiner

*Primary Examiner*—Bryan Bui
(74) *Attorney, Agent, or Firm*—Lisa K. Jorgenson; William A. Munck

(57) ABSTRACT

The present invention is a temperature sensor which is based on the actual temperature coefficients of a device in the circuit, rather than a predetermined threshold voltage that varies across different devices. This temperature sensor includes a circuit which determines the temperature of a device. More particularly, CMOS circuit is provided which uses a current source to generate charge and discharge voltages applied to a capacitor. These voltages are dependent on the temperature coefficient of a resistor in the current source. The charge and discharge times are then used to determine a frequency which is dependent on the temperature coefficient of the resistor. Thus, the temperature is sensed based on the output frequency of the circuit. Additionally, the present invention includes a mechanism which allows the temperature sensor to be activated or deactivated as needed.

20 Claims, 3 Drawing Sheets

LOW VOLTAGE/LOW POWER TEMPERATURE SENSOR

BACKGROUND OF THE INVENTION

1. Field of the Invention

The present invention relates to a circuit which determines the temperature of a device. More particularly, a complementary metal oxide semiconductor (CMOS) circuit is provided which uses a current source to generate charge and discharge voltages applied to a capacitor. These voltages are dependent on the temperature coefficient of a resistor in the current source. The charge and discharge times are then used to determine a frequency which is dependent on the temperature of the resistor. Thus, the temperature is sensed based on the output frequency of the circuit.

2. Description of Related Art

In the computer and data processing industry there is an ever increasing demand for higher processing speeds and systems which are capable of performing multiple tasks in parallel. Often times there are tradeoffs associated with this increased processing performance. One example is an increased level of power consumption and corresponding increase in the amount of heat generated by a particular device or IC.

Temperature sensors have many applications. A large number of circuits and/or functional units in today's electronic devices are temperature sensitive and require accurate and reliable temperature information in order to take corrective action when the temperature becomes too high. For example, the system frequency may be reduced when a certain temperature threshold is reached in order to cause the temperature to be reduced below the critical point. Further, systems, such as portable electronic devices (games, laptops, notebook computers, personal digital assistants), and the like are sensitive to power consumption and may need to shut down all or part of their operations when the power, which is function of temperature, reaches a certain level. Additionally, some individual circuits may need to be disconnected or shut down when the temperature reaches a predetermined level. Another application is an oscillator, such as a crystal oscillator which is frequency dependent. In this case a temperature sensor is required to adjust the accuracy of the output frequency. Rechargeable battery applications is yet another area wherein an accurate and reliable temperature sensor will have utility.

Conventional temperature sensing techniques are typically based on a predetermined value of a transistor threshold voltage. In reality the integrated circuit (IC) fabrication process is not exactly consistent between groups of wafers, or lots. Thus, a threshold voltage for transistors in a particular lot of wafers will not be the same as the threshold voltage for the transistors in another lot. Thus, the correlation between the frequency and the temperature will not be consistent between sensors fabricated in different lots. The functional units relying on the temperature to perform various data processing activities may operate at different temperatures resulting in inconsistent results across the same device fabricated in a different lot.

Therefore, it can be seen that a need exists for a temperature sensor that provides greater consistency when manufactured at different times and in different lots in order to provide a temperature dependent output signal having increased accuracy.

SUMMARY OF THE INVENTION

In contrast to the prior art, the present invention is a temperature sensor which is based on the actual temperature coefficients of a device in the circuit, rather than a predetermined threshold voltage that varies across different devices.

Broadly, the present invention relates to a circuit which determines the temperature of a device. More particularly, CMOS circuit is provided which uses a current source to generate charge and discharge voltages applied to a capacitor. These voltages are dependent on the temperature coefficient of a resistor in the current source. The charge and discharge times are then used to determine a frequency which is dependent on the temperature of the resistor. Thus, the temperature is sensed based on the output frequency of the circuit.

An additional feature of the present invention is a mechanism which allows the temperature sensor to be activated or deactivated as needed.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

In order for the various data processing systems to utilize the functions of the present invention, the temperature sensor is provided in selected ones of the integrated circuits, or chips, that make up the system. For example, the temperature sensor of the present invention may be provided on an application specific integrated circuit (ASIC) in the clocking portion. In this manner, the frequency output from the clock circuit can be lowered when the sensor of the present invention determines that a temperature above a predetermined threshold has been reached. Thus, control signals can be provided to the clock circuit, such as a phase locked loop (PLL) in order to regulate the temperature of the chip. This clock circuit may be used to drive the frequency of a microprocessor, microcontroller, digital signal processor (DSP) or like embedded on the ASIC. In another application, the sensor of the present invention can determine when a temperature threshold is reached in order to turn off various non-critical portions of an IC to reduce the power consumption and corresponding temperature. Those skilled in the art will be familiar with numerous other uses of the temperature sensor of the present invention.

Figure 1:
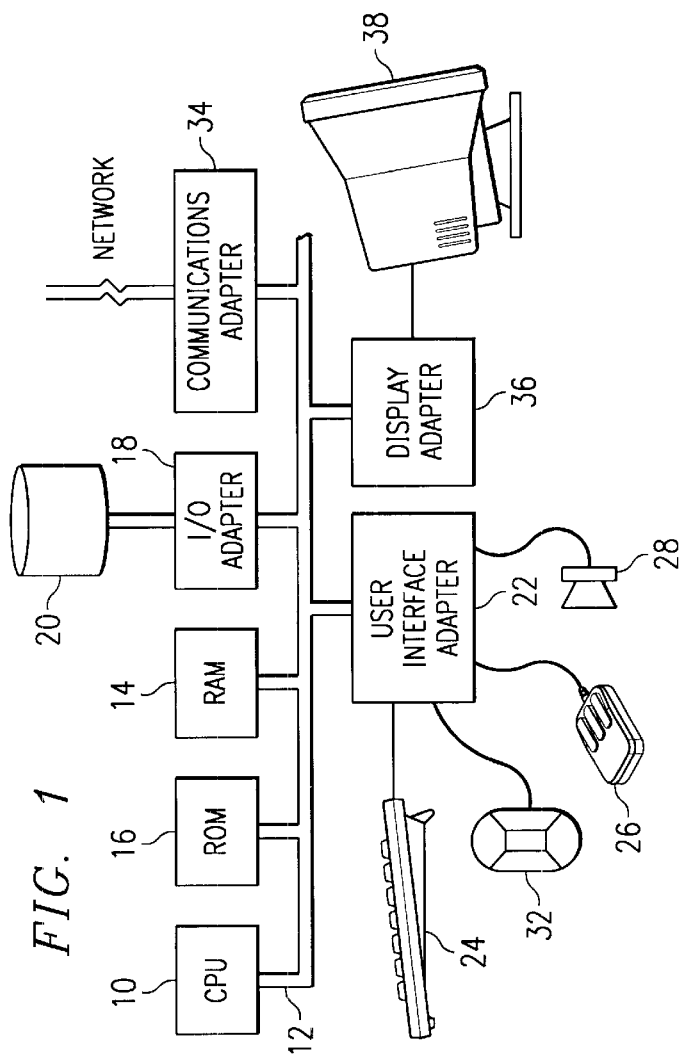
FIG. 1 is a block diagram of a data processing system including components capable of implementing the present invention.

Referring to FIG. 1, a typical data processing system is shown which may be used in conjunction with the present invention. This data processing system could include virtually any system having a need to regulate the temperature of an included device or circuit, including a laptop computer, PDA, desktop computer, or the like. A central processing unit (CPU) 10 such as the Pentium II microprocessor, commercially available from Intel Corp. may be provided, although other microprocessors from other manufacturers, such as the PowerPC microprocessor, commercially available from IBM Corporation may also be used. Microprocessor 10 is interconnected to the various other components by system bus 12 read only memory (ROM) 16 is connected to CPU 10 via bus 12 and includes the basic input/output system (BIOS) that controls the basic computer functions. Random access memory (RAM) 14, I/O adapter 18 and communications adapter 34 are also interconnected to system bus 12. I/O adapter 18 may be a small computer system interface (SCSI) adapter that communicates with a disk storage device 20. Communications adapter 34 interconnects bus 12 with an outside network enabling the data processing to communication with other such systems, via the internet, local area network (LAN), or the like. Input/output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboards 24, trackball 32, or mouse 26 and receiving output from the system via speaker 28 and display 38. Additionally, an operating system, such as one of the versions of Windows, commercially available from Microsoft Corporation is used to coordinate the functions of the various components shown in FIG. 1.

Figure 2:
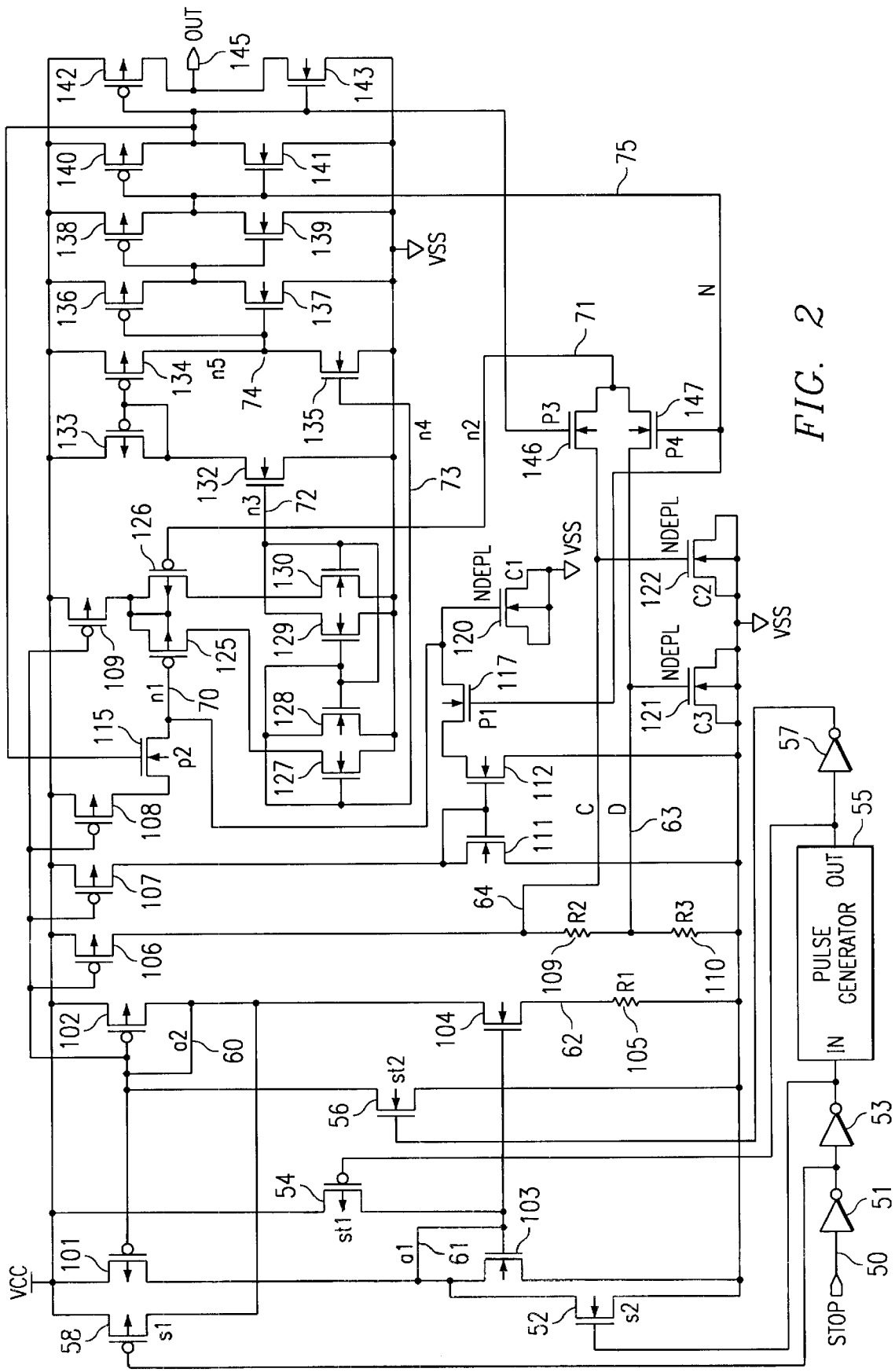
FIG. 2 is a schematic diagram of the elements that make up a preferred embodiment of the present invention.
Figure 4A:
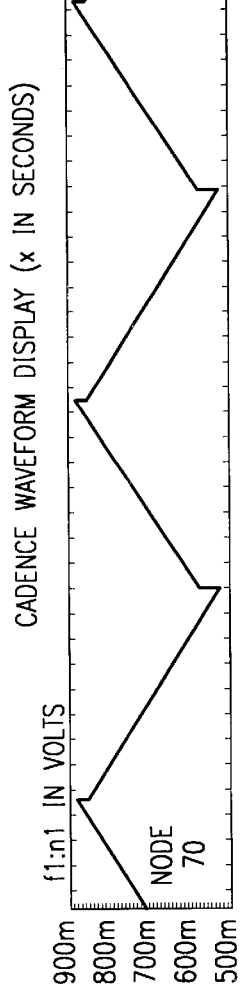
FIG. 4 are timing diagrams showing the waveforms at particular times which are present at various nodes in the circuit schematic of FIG. 2.
Figure 4B:
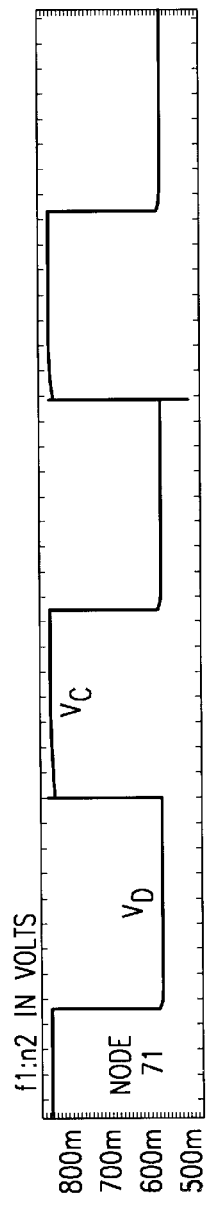
Figure 4C:
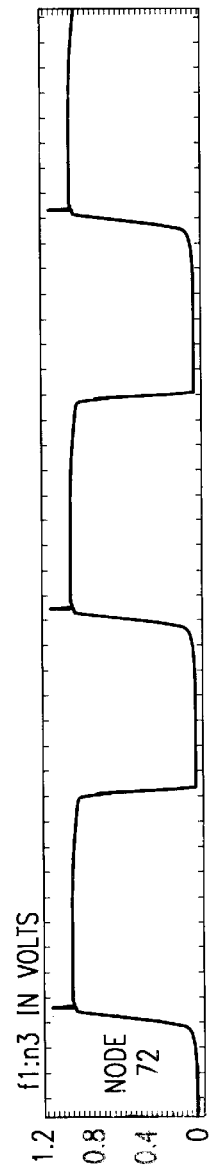
Figure 4D:
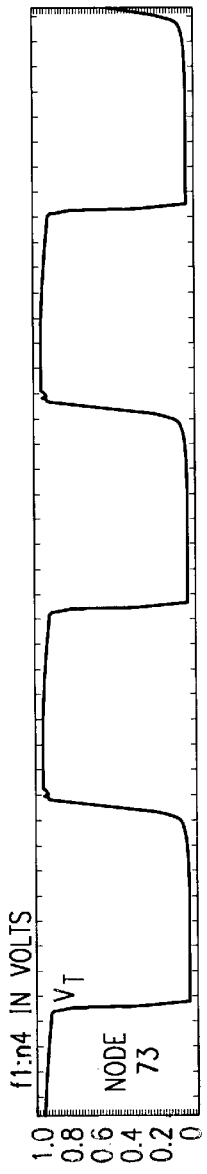
Figure 4E:
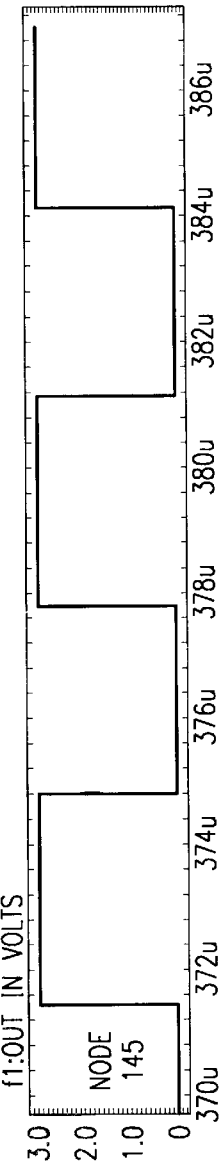

Referring to FIG. 2, a preferred embodiment of the temperature sensor of the present invention is shown. In this embodiment a switching mechanism is shown with allows the temperature sensor to be turned on or off. In some instances it is advantageous to have the ability to control whether or not the temperature sensor is operating. For example, when a data processing system is in a low power or "sleep" mode it is not necessary for the temperature sensor to be operational, since during "sleep" mode most functions of the system are turned off and the temperature will be at an acceptable level.

More particularly, a switching circuit is shown which can be used by the system microprocessor or controller to disable the temperature sensor in order to further reduce the total power consumption. An input signal is provided on node 50 to a first inverter 51. Additionally, a second inverter 53, delay circuit 55 and third inverter 57 are also part of the switching circuit. A P-type transistor 58 is shown with its gates connected to the output of inverter 51. P-type devices will conduct electricity when a logical "0" (absence of a voltage) is provided to their gate. An N-type transistor 52 having its gate connected to the output of inverter 53. N-type transistors will conduct electricity when a logical "1" (voltage) is applied to their gate. P-type transistor 54 is also shown with its gate connected to the output of delay circuit 55, and it can be seen N-type transistor 56 has its gate connected to the output of inverter 57.

When a "stop" signal input to node 50 is set equal to logical 1, then the current source formed by transistors 101, 102, 103, 104 and resistor 105 is turned off. Specifically, when the output of inverter 51 transitions from a "1" to a "0" transistor 58 will conduct electricity and pull node 60 to Vcc. The output of inverter 53 will be a "1" when the input to node 50 is set. Therefore, transistor 52 will conduct electricity and pull node 61 down to the reference voltage (potential), in this case, Vss. It can be seen that when node 60 is at Vcc, transistors 101 and 102 will not conduct and cannot supply the current needed for the temperature sensor to operate. Transistor 106, 107, 108 and 109 are P-type transistors and form current mirrors. Each of these transistors has its gate connected to node 60 such that when transistors 101 and 102 of the current source are off they will also be turned off.

When it is desired for the system to turn on the temperature sensor the input control signal at node 50 is switched from high (1) to low (0). This causes a short pulse to be generated at the gate of transistor 54 (from delay circuit 55). Also a pulse is provided from inverter 57 to the gate of transistor 56. When transistor 54 conducts, node 61 will then be pulled up to Vcc causing transistors 103 and 104 of the current source to conduct. Similarly, node 60 is pulled down to Vss when transistor 56 begins to conduct and transistor 101 and 102 also begin to conduct and the current source then operates.

Next, the operation of the temperature sensor will be described, also in conjunction with FIG. 2. As noted above, transistors 101, 102, 103, 104 and resistor 105 form a current source which provides electrical current through transistors 102, 104 and resistor 105. All of the transistors, 101, 102, 103 and 104 are working at weak inversion.

The voltage (Va) at node 62 can be determined using the following equation:

$$Va = kT/q \ln S_{104} S_{101}/S_{103} S_{102}. \quad (1)$$

Where k is Boltzmann's constant, q is electron charge and T is temperature in degrees Kelvin. This constant (kT/q) is about 26 millivolts at 300 degrees K. In equation (1), "S" represents the transistor size, i.e. width/length (W/L), for the transistors in the current source (101, 102, 103, 104). A current mirror is formed by transistor 106 wherein the same current that flows through transistors 102, 104 and resistor 105 will also flow through transistor 106 and resistors 109 and 110.

The voltage (Vd) at node 63 can be determined in accordance with the following equation:

$$Vd = (S_{106}/S_{102})(R_{110}/R_{105})(Va). \quad (2)$$

And the voltage (Vc) at node 64 can be determined by the following:

$$Vc = (S_{106}/S_{102})((R_{109}+R_{110})/R_{105})(Va). \quad (3)$$

Vc is the voltage drop across resistors 109 and resistor 110, and Vd is the voltage across resistor 110.

In a preferred embodiment of the present invention, the capacitors are implemented by using N-type depletion transistors. That is, the source and drain of an N-type transistor are coupled to one another and a capacitance is created across the gate and the connected source/drain of the transistor. Capacitors 120, 121 and 122 are such N-depletion transistors. The temperature sensor of the present invention then utilizes capacitor 120 to determine the output frequency. More particularly, when the current source is active, transistor 108 will be turned on to conduct electricity. When N-type transistor 115 is on, the current will be used to charge capacitor 120. P-type transistor 107 will also conduct when transistor 108 is turned on. This will cause transistors 111 and 112 to conduct such that capacitor 120 has a path to Vss for the discharge current. The current used to charge capacitor 120 is represented by the following equation:

$$Ic = (S_{108}/S_{102})(Va/R_{105}). \quad (4)$$

The discharge current from capacitor 120 can be characterized by:

$$Id = (S_{112}/S_{111})(S_{107}/S_{102})(Va/R_{105}). \quad (5)$$

The voltages Vc and Vd, as noted above, are the charging and discharging voltages, respectively.

The voltage at node 71 is switched between Vc and Vd through two N-type transistor passgates 146 and 147. When passgate 146 is turned on, the voltage on node 71 is at Vc (charge). Also, when transistor 146 is turned on N-type passgate transistor 115 will also be turned on allowing capacitor 120 to be charged to the Vc voltage level through node 70. While the voltage at node 70 is greater than the voltage at node 71, the voltage at node 72 is approximately the same as the threshold voltage (Vtn) of an N-type transistor, e.g. transistor 130 and the voltage at node 73 is substantially zero (0). At the next transition, node 75 goes high (1) and turns on passgate 147 and N-type pass gate, transistor 117. In this case, the voltage at node 71 then switches to the Vd (discharge) level. When passgate 117 turns on, node 70 begins to discharge to the Vd voltage level and the discharge current will flow through transistor 112 to Vss.

In a preferred embodiment of the present invention a comparator is used to as a current to frequency converter. More particularly the comparator will transform the analog current output sensor signal to a digital control signal. The comparator is formed by P-type transistors 109, 125 and 126, along with N-type transistors 127, 128, 129 and 130, where transistors 128 and 129 are provided, in a preferred embodiment, to add more gain to transistors 127 and 130. As shown in more detail by FIG. 4, the waveforms at nodes 72 and 73 are quasi square waves with a 180 degree phase shift. The frequency of these square waves carry the temperature information. This frequency can be translated into a digital number by counting the square wave pulses over a predetermined period.

A differential to single converter (level shifter) is then utilized in a preferred embodiment of the present invention to translate the differential waveforms into a single temperature dependent signal. This converter is formed by P-type transistors 133 and 134 in conjunction with N-type transistors 132 and 135. From FIG. 4, it can be seen that when node 73 is at the threshold voltage of an N-type transistor (Vtn), node 72 will be low and vice versa. During the time period when node 72 is at the Vtn level, transistor 132 will be turned on causing the gates of transistors 133 and 134 to be pulled to Vcc−Vtp. That is, the gates of these transistors is pulled to the voltage level of the input voltage (Vcc) minus the threshold voltage of a P-type transistor (Vtp). This, in turn causes node 74 to be pulled up to voltage Vcc. Node 74 is effectively the output of the temperature sensor of the present invention. However, this node is connected to a series of inverters which are used to increase the speed of the signal on node 74. In a preferred embodiment four (4) inverters are connected. These inverters are formed by P-type transistors 136, 138, 140 and 142, connected with N-type transistors, 137, 139, 141 and 143, respectively. Thus, when node 72 is at the Vtn level, node 74 will also be high and the output of the temperature sensor at node 145 will also be high. During this same time period, node 73 will is low and will not turn on transistor 135. However, during the next time period, node 73 will be at the Vtn voltage level turning on transistor 135 which causes node 74 to be pulled down to Vss thereby turning on P-type transistor 136, This causes the output of the inverter (formed by transistors 136 and 137) to be high (1). In this case the output of the temperature sensor at node 145 will be low (0). Thus, when node 73 is high, the output at node 145 will be low.

In this manner the temperature sensor of the present invention will provide an output signal at node 145 having a frequency that is dependent on the temperature of various components in the circuit. The frequency at the output will be based on two time periods, i.e. the time to charge the capacitor 120 and the time it takes to discharge the capacitor. The time to charge the capacitor is shown by the following equation:

$$t_c = (C_{120})(Vcd)/Ic; \tag{6}$$

where $$Vcd = Vc - Vd = (S_{106}/S_{102})(R_{109}/R_{105})(Va). \tag{7}$$

The time period for the sensor to discharge is determined by the following:

$$t_d = (C_{120})(Vcd)/Id. \tag{8}$$

The frequency at the output is shown by:

$$\text{Frequency} = 1/(t_c + t_d). \tag{9}$$

Then, substituting equations (4), (5), (6), (7) and (8) into equation (9), the following equation is generated:

$$\text{Frequency} = [(S_{108}/S_{102})(S_{112}/S_{111})(S_{107}/S_{102})]/[(C_{120})(S_{106}/S_{102})(R_{109})][(S_{108}/S_{102}) + (S_{112}/S_{111})(S_{107}/S_{102})]. \tag{10}$$

Therefore, it can be seen in equation (10) that $R_{109}$ is the only temperature dependent element. Since the temperature coefficient of this resistance (TCR) is known, the frequency output will be inversely proportional to the TCR. By monitoring the frequency the temperature of the circuit can be determined. That is, as the frequency changes the chip temperature is sensed. Those skilled in the art will understand that a device, such as a counter, or the like can be connected to the output node 145 to monitor the frequency of the output signals, i.e. the number of times capacitor 120 charges and discharges over a given time period. For materials with a positive TCR, as the temperature increases, the frequency will decrease. Similarly, as the temperature decreases the frequency will correspondingly increase. Thus, the frequency is inversely proportional to the temperature of the sensing circuit, i.e. the thermal coefficient of the resistance for resistor $R_{109}$. Once the frequency is sensed it can be determined if the temperature is above a predetermined threshold level. If so, then corrective action can be taken to shut off various functions in the device, turn off the entire device, or the like. When the frequency decreases to correspond to a temperature below the predetermined threshold, these functions can be turned back on. Of course, more than one predetermined threshold level is contemplated by the present invention wherein each level may correspond to different functions on the device.

One advantage of the temperature sensor of the present invention is that the frequency will be substantially supply voltage independent. Further, the present invention is transistor model independent. More particularly, the temperature sensor of the present invention is not dependent on the threshold voltage of the transistors, it is threshold voltage (Vt) independent. Equation (10) depends entirely on the actual characteristics of the circuit components, rather than a predetermined threshold voltage value for the N-type and P-type devices in the circuit.

The present invention will function at very low voltages since the current source includes only a single P-type transistor 101 and 102. Therefore, the current can be provided by applying only the threshold voltage (Vtp) across these transistors, plus an additional small amount of voltage (on the order of a few hundred millivolts). It can be seen that the amount of power consumed by the present invention will also be relatively low based on the small amount of voltage needed for the temperature sensor circuit to operate. That is, the power is directly proportional to the voltage (P=VA).

In another preferred embodiment of the present invention, a constant frequency oscillator can be provided. This oscillator will also be a low power, low voltage system in accordance with the previous discussion and the description of the switching circuit of FIG. 3. By properly choosing the resistor $R_{109}$, such as an N-type resistor, to have a zero (0) temperature coefficient of resistance at a particular ambient temperature, the frequency output of the circuit will be constant. Thus, an accurate frequency level can be maintained. Those skilled in the art will understand that it may be necessary, for example, to alter the TCR for a corresponding temperature, such as by laser trimming or the like, in order to obtain a reference frequency at room temperature.

Figure 3:
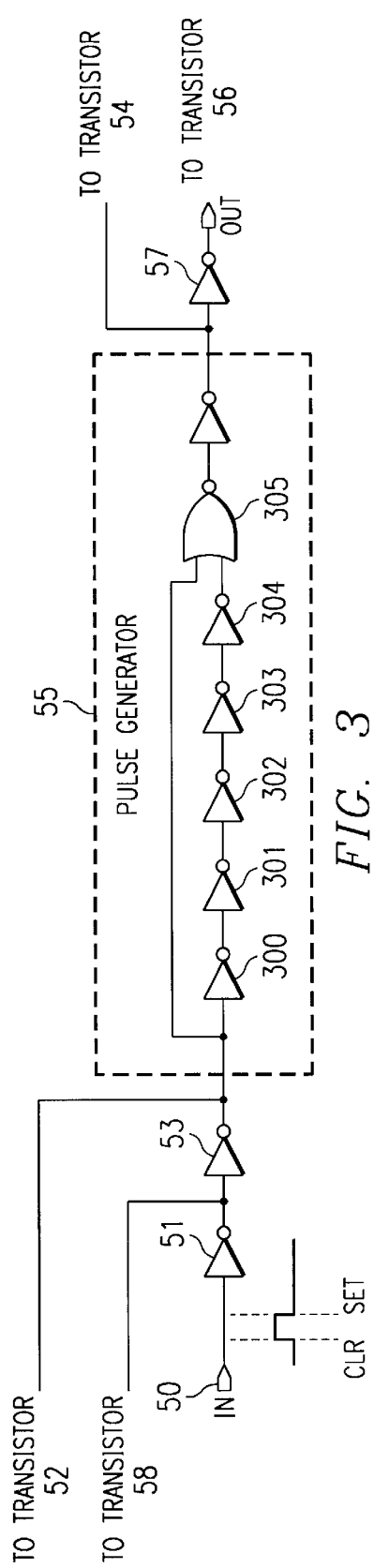
FIG. 3 is a more detailed schematic diagram of the activation mechanism of the present invention.

Referring to FIG. 3, a more detailed schematic of the switching circuit of the present invention is shown and will be described in conjunction with FIG. 2. Inverters 51 and 53 are shown connected to pulse generator 55 which includes a delay circuit. This delay circuit includes five (5) additional inverters, 300, 301, 302, 303 and 304 connected in series. The input to pulse generator circuit 55 is also connected as one input to a NOR gate 305 with the output of the series of inverters from inverter 304 being the other input to NOR gate 305. As shown in FIG. 2, the output of pulse generator circuit 55 is provided to inverter 57.

More particularly, when a logical zero (0) is input at node 50, inverter 51 outputs a logical one (1) to transistor 58 of FIG. 2 and inputs a one to inverter 53 which outputs a zero to transistor 52 and to pulse generator circuit 55. In this case a zero is input to NOR gate 305 at node A, while a one is output from inverter 304 and input to NOR gate 305 at node B. Those skilled in the art will understand that a time delay occurs for the binary input to inverter 300 to be processed by each inverter 300, 301, 302, 303, 304 and then output to NOR gate 305 as a logical one. In this manner, when a zero is input to node 50, a zero is also input to inverter 300 and node A of NOR gate 305. Delay inverters 300, 301, 302, 303 and 304 will then cause a one to be input at node B of NOR gate 305. At this time, a zero will be output from NOR gate 305 and a one will be output to P-type transistor 54 with a zero output to N-type transistor 56. During this period, none of transistors 52, 54, 56 or 58 are turned on. When a logical one (1) is input at node 50, a one is output to transistors 52 (on) and 54 and a zero is output to transistors 56 and 58, i.e. transistors 54 and 56 will not be turned on, while transistors 52 and 58 will be on to keep the sensor off. Specifically, a one input to NOR gate 305 on node A and a zero input to NOR gate 305 on node B causes a zero to be output to inverter 306. This in turn causes a one to be input to P-type transistor 54 (off) and inverter 57. The output of inverter 57 is a zero which is then input to N-type transistor 56 (off).

When it is desired to turn on the temperature sensor of the present invention, the input at node 50 transitions back to a logical zero, which places a zero on node A of NOR gate 305 at the same time the previous logical zero is still on node B of NOR gate 305. Therefore, during the delay time required for the logical one (due to the logical zero now input to node 50) to traverse the delay inverters (300, 301, 302,303, 304) a zero, zero (0, 0) will be present on nodes A and B of NOR gate 305. During this time a logical one output pulse is generated from NOR gate 305. This pulse will have a duration substantially equivalent to the amount of time required for the zero input to inverter 300 to traverse the delay inverters. The output pulse from NOR gate 305 will then cause the temperature sensor of the present invention to begin operating. That is, a logical one is output from NOR gate 305 thus causing a logical zero to be provided from inverter 306 to P-type transistor 54, which turns this transistor on. Additionally, a one is output from inverter 57 that will cause N-type transistor 56 to being to conduct. As noted previously, transistor 54 will input Vcc to the gate of transistors 103, 104 and transistor 56 will pull the gate of transistors 101, 102 to Vss causing it to be turned on. The current source of the temperature sensor will then begin operation. Subsequent to the duration of the output pulse from generator 55, the switching mechanism will remain off until the input to node 50 is changed to logical zero when transistors 52 and 58 are turned off and the current generator ceases operation until a transition to a logical one occurs at node 50 and a pulse is subsequently generated from NOR gate 305 by changing the input to node 50 to a zero.

The switching operation of the temperature sensor in accordance with these output signals has been described above in conjunction with FIG. 2. Thus, a control circuit can be used to provide the input signals to node 50 that will cause the temperature sensor of the present invention to be shut off in order to conserve electrical power.

FIG. 4 is a timing diagram showing the waveforms present at various ones of the nodes in the temperature sensor circuit of FIG. 2. It can be seen that the first waveform, present and node 70, is substantially a sawtooth wave that represents capacitor 120 during its charging state (upward slope) during the time when the voltage charging voltage Vc is present on node 71 and then discharging (downward slope) when the discharge voltage Vd is present on node 71. The waveform on node 70 is based upon the frequency of the capacitor and the temperature coefficient of resistor R2. This signal will then be transformed into a digital signal such that the frequency can be monitored, and therefore, the current sensed by basically counting the signal transitions at the output node 145.

The second waveform shows the voltage on node 71. It can be seen that the charge voltage Vc corresponds to the charging of capacitor 120 which occurs when transistor 146 of the pass gate is turned on. Voltage Vd corresponding to the discharge of capacitor 120 and occurs when transistor 147 of the pass gate is turned on.

The third waveform shows the voltage on node 72 which is an output of the differential comparator circuit formed by transistors 125, 126, 127, 128, 129 and 130. The fourth waveform represents the voltage on node 73 which is another output of the comparator circuit. It can be seen from FIG. 4 that the output signals at nodes 72 and 73 are 180 degrees out of phase with one another. These signals are then input to a differential to single converter circuit formed by transistors 132, 133, 134 and 135. Node 74 is the output of this converter circuit and provides an output signal to four (4) inverters.

The fifth waveform is the temperature sensor circuit output. It can be seen that it follows the waveform at node 72. More particularly, when node 72 is at Vtn, transistor 132 is turned on and causes reference potential to be input to the gate of N-type transistor 134 which places a logical one on node 74. This will cause a logical one to be output on node 145 (an even number of inverters is present between nodes 74 and 145). When node 73 is at Vtn, N-type transistor 135 is turned on causing a reference potential (logical 0) to be output on node 74 and ultimately on node 145. Thus, it can be seen that the output on node 145 follows the waveform on node 72, but is the complement of the waveform on node 73.

Although certain preferred embodiments have been shown and described, it should be understood that many changes and modifications may be made therein without departing from the scope of the appended claims.

What is claimed is:

1. A temperature sensor, comprising:
   a current source having a plurality of transistors and coupled to at least one resistor, said current source driving a current through said resistor; and
   means for converting said current from said current source and said resistor to a temperature dependent frequency signal, wherein the temperature dependence of said frequency signal derives from temperature characteristics of said at least one resistor and is independent of a threshold voltage of any of said plurality of transistors.

2. A sensor according to claim 1 wherein said temperature dependent frequency signal is based upon a thermal coefficient of resistance of said at least one resistor.

3. A sensor according to claim 2 wherein a frequency of said temperature dependent frequency signal is proportional to a temperature of said at least one resistor.

4. A sensor according to claim 1 wherein said means for converting comprises:
   a capacitor coupled to temperature dependent charge and discharge voltages at opposite terminals of said at least one resistor;
   a comparator for receiving an input signal from said capacitor and for outputting differential phase shifted control signals based thereon; and
   a circuit for combining said differential phase shifted control signals and for outputting said temperature dependent frequency signal.

5. A sensor according to claim 4 further comprising means for monitoring said temperature dependent frequency signal, and for regulating the operation of other circuits based upon a predetermined temperature level.

6. A sensor according to claim 5 further comprising means for deactivating said temperature sensor based upon an external control signal.

7. A sensor according to claim 1 wherein said temperature dependent frequency signal is independent of a supply voltage for said current source.

8. A sensor according to claim 1 further comprising:
   a current mirror coupled between said current source and said at least one resistor, said current mirror driving a current equal to an output current of said current source through said at least one resistor; and
   at least one capacitor coupled to said at least one resistor, wherein charge and discharge times for said at least one capacitor, which are dependent upon a voltage across said at least one resistor, are employed to generate said temperature dependent frequency signal.

9. A sensor according to claim 8 further comprising:
   a level shifter coupled between said at least one resistor and said at least one capacitor, said level shifter converting a differential voltage across said resistor to a single temperature dependent signal forming said temperature dependent frequency signal; and
   an inverter coupled to said level shifter.

10. A sensor according to claim 8 wherein said a frequency of temperature dependent frequency signal is proportional to both a capacitance of said at least one capacitor and a resistance of said at least one resistor.

11. A sensor according to claim 8 further comprising:
    a comparator coupled to said at least one capacitor and converting a current from charge or discharge of said at least one capacitor to a frequency signal.

12. A sensor according to claim 8 further comprising:
    a switching mechanism switching a terminal of said at least one capacitor between a charge voltage at one terminal of said at least one resistor and a discharge voltage at an opposite terminal of said at least one resistor.

13. A sensor according to claim 1 wherein a resistance of said at least one resistor is an only temperature dependent variable affecting a frequency of said temperature dependent frequency signal.

14. A method of sensing a temperature in an integrated circuit device, comprising the steps of:
    providing a current from a current source driving at least one resistor included in said integrated circuit device, said current source having a plurality of transistors and coupled to said at least one resistor; and
    converting said current from said current source to a temperature dependent frequency signal, wherein the temperature dependence of said frequency signal derives from temperature characteristics of said at least one resistor and is independent of a threshold voltage of any of said plurality of transistors.

15. A method according to claim 14 wherein said temperature dependent frequency signal is based upon a thermal coefficient of resistance of said at least one resistor.

16. A method according to claim 15 wherein a frequency of said temperature dependent frequency signal is proportional to a temperature of said at least one resistor.

17. A method according to claim 16 wherein said steps of converting comprises the steps of:
    providing a capacitor coupled to temperature dependent charge and discharge voltages at opposite terminals of said at least one resistor;
    receiving, by a comparator, an input signal from said capacitor and outputting, by said comparator, differential phase shifted control signals based thereon; and
    combining said differential phase shifted control signals and outputting said temperature dependent frequency signal.

18. A method according to claim 17 further comprising the steps of:
    monitoring said temperature dependent frequency signal; and
    regulating the operation of other circuits based upon a predetermined temperature level.

19. A method according to claim 18 further comprising the step of deactivating said temperature sensor based upon an external control signal.

20. A data processing system having a mechanism for regulating the power consumption of components included in said data processing system, comprising:
    at least one integrated circuit device that performs a portion of data processing functions in said data processing system;
    a temperature sensor having a current source having a plurality of transistors and coupled to at least one resistor, said sensor including means for converting a current from said current source and driven through said at least one resistor to a temperature dependent frequency signal, wherein temperature dependence of said frequency signal derives from temperature characteristics of said at least one resistor and is independent of a threshold voltage across any of said plurality of transistors; and
    a monitor for determining when said temperature dependent frequency signal reaches a predetermined threshold and controlling operation of said at least one integrated circuit based thereon.

* * * * *